(12) United States Patent
Naseh et al.

(10) Patent No.: US 7,769,886 B2
(45) Date of Patent: Aug. 3, 2010

(54) APPLICATION BASED ACTIVE-ACTIVE DATA CENTER NETWORK USING ROUTE HEALTH INJECTION AND IGP

(75) Inventors: Zeeshan Naseh, Santa Clara, CA (US); Vinay Gundi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1098 days.

(21) Appl. No.: 11/066,955

(22) Filed: Feb. 25, 2005

(65) Prior Publication Data

US 2006/0195607 A1    Aug. 31, 2006

(51) Int. Cl.
G06F 15/173    (2006.01)
(52) U.S. Cl. ..................................... 709/238
(58) Field of Classification Search ......... 709/238–241, 709/225; 370/229–238, 351, 396–397, 217–219
See application file for complete search history.

(56) References Cited

U.S. PATENT DOCUMENTS

| | | | |
|---|---|---|---|
| 5,774,668 A * | 6/1998 | Choquier et al. | 709/223 |
| 5,951,694 A * | 9/1999 | Choquier et al. | 714/15 |
| 6,173,324 B1 | 1/2001 | D'Souza | |
| 6,182,139 B1 * | 1/2001 | Brendel | 709/226 |
| 6,714,549 B1 * | 3/2004 | Phaltankar | 370/397 |
| 6,760,775 B1 | 7/2004 | Anerousis et al. | |
| 6,785,737 B2 * | 8/2004 | Lee et al. | 709/241 |
| 6,963,575 B1 | 11/2005 | Sistanizadeh et al. | |
| 7,174,389 B2 * | 2/2007 | Orava et al. | 709/239 |
| 7,260,645 B2 * | 8/2007 | Bays | 709/238 |
| 7,505,401 B2 * | 3/2009 | Kashyap | 370/217 |
| 7,609,619 B2 | 10/2009 | Naseh et al. | |
| 2002/0124080 A1 | 9/2002 | Leighton et al. | |
| 2002/0163910 A1 | 11/2002 | Wisner et al. | |
| 2003/0039212 A1 * | 2/2003 | Lloyd et al. | 370/235 |
| 2003/0067924 A1 | 4/2003 | Choe et al. | |
| 2003/0118024 A1 * | 6/2003 | Lee et al. | 370/395.1 |
| 2003/0233473 A1 * | 12/2003 | Bonhomme et al. | 709/238 |
| 2004/0008700 A1 | 1/2004 | Visser et al. | |
| 2004/0042396 A1 | 3/2004 | Brown et al. | |
| 2004/0085965 A1 | 5/2004 | Fotedar | |
| 2004/0143662 A1 * | 7/2004 | Poyhonen et al. | 709/225 |

(Continued)

OTHER PUBLICATIONS

Data Center Design and Implementation with Cisco Catalyst 6500 Service Modules, Copyright 2004, 88 pages, Version 2.0, Cisco Systems, Inc., San Jose, CA, USA.

(Continued)

*Primary Examiner*—William C. Vaughn, Jr.
*Assistant Examiner*—Greg Bengzon
(74) *Attorney, Agent, or Firm*—Schwegman, Lundberg & Woessner, P.A.

(57) ABSTRACT

A distributed data center topology having at least a pair of active data centers that can recover from a disaster at one of the data centers and achieves load balancing using IGP (Interior Gateway Protocol) between data centers. The distributed data centers use virtual IP addresses, route health injection and Border Gateway Protocol (BGP) for business continuance, disaster recovery and load balancing. Active applications are deployed at each data center to provide a logical active/standby configuration for certain applications. Alternatively, active applications are deployed at both sites and BGP routes traffic to the closest data center edge router. Load balancing occurs over an internal IGP link between sites.

19 Claims, 2 Drawing Sheets

U.S. PATENT DOCUMENTS

| | | | |
|---|---|---|---|
| 2004/0215752 A1* | 10/2004 | Satapati et al. | 709/223 |
| 2004/0218584 A1 | 11/2004 | Brown | |
| 2004/0257983 A1 | 12/2004 | Kopp et al. | |
| 2005/0010653 A1 | 1/2005 | McCanne | |
| 2005/0047413 A1 | 3/2005 | Ilnicki et al. | |
| 2005/0068968 A1* | 3/2005 | Ovadia et al. | 370/396 |
| 2005/0080923 A1* | 4/2005 | Elzur | 709/238 |
| 2005/0089015 A1* | 4/2005 | Tsuge et al. | 370/351 |
| 2006/0036761 A1 | 2/2006 | Amra et al. | |
| 2006/0050719 A1 | 3/2006 | Barr et al. | |
| 2006/0193252 A1 | 8/2006 | Naseh et al. | |
| 2009/0201800 A1 | 8/2009 | Naseh et al. | |

OTHER PUBLICATIONS

Business Ready Data Center, Copyright 1992-2005, 2 pages, Cisco Systems, Inc., San Jose, CA, USA.

On-Line Education, International Engineering Consortium, Copyright 2005, 2 pages, Cisco Systems, Inc., San Jose, CA, USA.

Policy-Based Routing, Copyright 1996, p. 1-7, Cisco Systems, Inc., San Jose, CA, USA.

CSM One-Arm Design in the Data Center, Copyright 2004, 22 pages, Version 2.0, Cisco Systems, Inc., San Jose, CA, USA.

Virtual LAN Security Best Practices, Copyright 1992-2002, pp. 1-13, Cisco Systems, Inc., San Jose, CA, USA.

Removing Content Switching Performance Barriers: A Discussion of the Cisco CSM Pipelined Network Processor Architecture, Copyright 1992-2002, pp. 1-20 Cisco Systems, Inc., San Jose, CA, USA.

Routing Basics, Internetworking Technologies Handbook, Feb. 20, 2002, Copyright 1992-2002, pp. 1-10, Cisco Systems, Inc., San Jose, CA, USA.

Katabi, et al, A Framework for Scalable Global IP-Anycast (GIA), 13 pages, MIT Laboratory for Computer Science, Cambridge, MA, USA / This research was supported by the US Defense Advanced Research Projects Agency (DARPA) under contract No. N66001-98-1-8903.

Semeria, Understanding IP Addressing: Everything You Ever Wanted to Know, Copyright 2001, 76 pages, 3Com Corporation, Santa Clara, CA, USA.

What's a Netmask? And Why Do I Need One?, Apr. 2000, 3 pages, http://www.iohnscloset.net/primer/subnet.html.

Brennen, The Name Service How To, Copyright 2004, version 0.04, pp. 1-20.

Removing Content Switching Performance Barriers: A Discussion of the Cisco CSM Pipelined Network Processor Architecture, Copyright 1992-2002, pp. 1-20, Cisco Systems, Inc., San Jose, CA USA.

Release Notes for Catalyst 6500 Series Content Switching Module Software Release 3.1(9), Copyright 2004, Nov. 2004, 68 pages, Software Release 3.1(9), Cisco Systems, Inc., San Jose, CA USA.

Morrissey, P., "Multihoming with BGP4", *Network Computing*, vol. 10. No. (25), (Dec. 1999), pp. 117-118, 120.

US 7,525,906, 04/2009, Naseh et al. (withdrawn)

* cited by examiner

APPLICATION BASED ACTIVE-ACTIVE DATA CENTER NETWORK USING ROUTE HEALTH INJECTION AND IGP

COPYRIGHT NOTICE

A portion of the disclosure recited in the specification contains material that is subject to copyright protection. Specifically, documents provided with this application include source code instructions for a process by which the present invention is practiced in a computer system. The copyright owner has no objection to the facsimile reproduction of the specification as filed in the Patent and Trademark Office. Otherwise, all copyright rights are reserved.

RELATED APPLICATIONS

This application is related to the following and commonly-assigned U.S. patent applications Ser. No. 11/065,871, entitled Disaster Recovery For Active-Standby Data Center Using Route Health And BGP and Ser. No. 11/067,037, entitled Active-Active Data Center Using RHI, BGP, And IP Anycast For Disaster Recovery And Load Distribution, both of which were filed on Feb. 25, 2005 by Zeeshan Naseh and Vinay Gundi, the disclosures of which are incorporated herein by reference for all purposes.

BACKGROUND OF THE INVENTION

The present invention relates to a data center topology that can recover from a disaster and more particularly to a distributed data center that uses route health injection (RHI) and Border Gateway Protocol (BGP) for business continuance, disaster recovery and load balancing that is optimized for application based content distribution between two data centers.

Data centers store business information and provide global access to the information and application software through a plurality of computer resources. Data centers may also include automated systems to monitor server activity, network traffic and performance. Data centers may be known by a variety of names such as, by way of example, a server farm, hosting facility, server farm, data farm, data warehouse, co-location facility, co-located server hosting facility, corporate data center, managed data centers, internet hotel, internet service provider, application service provider, full service provider, wireless application service provider or other data network facility. Regardless of the name used, a typical data center houses computer resources such as mainframe computers; web, application, file and printer servers executing various operating systems and application software, storage subsystems and network infrastructure. A data center may be either a centralized data center or a distributed data center interconnected by either a public or private network.

A centralized data center provides a single data center where the computer resources are located. Because there is only one location, there is a saving in terms of the number of computer resources required to provide services to the user. Because there is only one location, management of the computer resources is much easier and capital and operating costs are reduced. Unfortunately, centralized data centers are rarely capable of providing the necessary reliability required under common service level agreements for a geographically diverse organization and the service is susceptible to interruption in the event of a disaster, such as a fire or earthquake, equipment malfunction or denial of service attack. For these reasons, centralized data centers are rarely relied upon as the sole data centers for critical applications.

A distributed data center is one that locates computer resources at geographically diverse data centers. The use of multiple data centers provides critical redundancy, albeit at higher capitol and operating costs, business continuity, disaster recovery, and load-sharing solutions. One type of distributed data center topology comprises at least a pair of data centers, both of which are active and traffic goes to the nearest active data center. Further, each data center may host applications so there must be a mechanism in place to balance the traffic loading on each data center. It is also necessary that in the event of a disaster where one data center is inoperable, that traffic directed to an application at the inoperable data center is seamlessly directed to another active data center.

Some distributed data centers use Domain Name System (DNS) for managing business continuance and load sharing between multiple data centers. Unfortunately, when DNS is utilized to direct traffic to the appropriate data center, performance is severely affected when one data center experiences a loss of a server or other disaster because the time it takes to clear the DNS cache throughout the network can take over 20 minutes and in certain cases more than 24 hours. During this time, traffic cannot be re-routed to the other data center. In other instances, application http-redirection is used to perform these tasks but even worse delays are experienced when there is a disaster at one of the data centers. Clearly, this extensive delay is unacceptable.

What is needed is a distributed data center topology that can quickly recover from a disaster at one of the data centers by re-routing traffic to the other data center and load balances traffic during normal operation.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
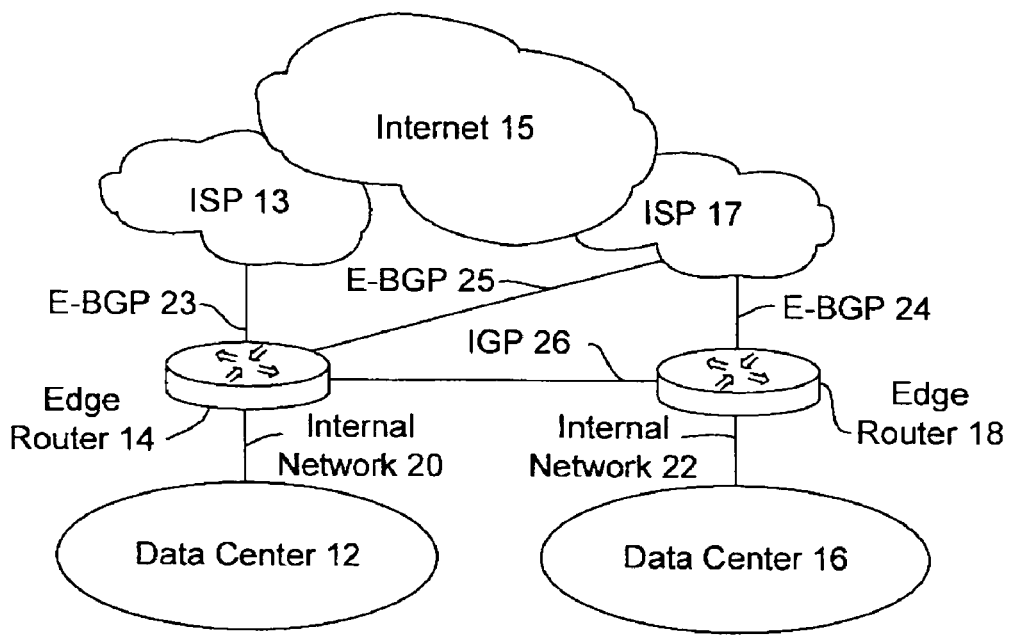
FIG. 1 is a block diagram of an exemplary active/active data center in accordance with an embodiment of the present invention.

Referring now to the drawings more particularly by reference numbers, a simplified block diagram of a representative active/active data center is shown in FIG. 1. Data center 12 interfaces to two internet service providers (ISP) 13 and 17 through edge router 14. ISPs 13 and 17 are part of the world wide web and can couple to other ISPs through the internet which is represented by internet cloud 15. Another data center 16 is also coupled to ISP 17 and to the internet 15 by edge router 18. In one preferred embodiment, one data center, such as data center 12, is linked to at least two ISPs while the other data center is coupled to at least one ISP, which may be one of the two ISPs or a different ISP.

Together, data centers 12 and 16 comprise an autonomous system with both data centers active. Although the autonomous system is illustrated with two data centers, multiple such data centers are contemplated. An autonomous system is a network or group of networks under a common administration and with common routing policies. Each AS has a unique identification number (the "AS number") assigned to it to provide for identification worldwide.

Communication between data center 12 and router 14 occurs over internal network 20 using IGP or, more specifically, the Interior Gateway Protocol. IGP is a well-known protocol that exchanges routing information within the autonomous system. Similarly, standby data center 16 also utilizes IGP to communication with router 18 over internal network 22. Web servers, application servers or other computer resources that are accessible through routers 14 or 18 propagate information by using IGP before BGP advertises routes to the internet.

Interautonomous system routing uses BGP or, more specifically the Exterior Border Gateway Protocol (E-BGP), to exchange routing information for ISPs 13 and 17 and the internet as indicated by E-BGP links 23, 24 and 25. E-BGP is a routing protocol used to exchange routing information across the internet. This protocol makes it possible for ISPs to connect to each other and for data centers 12 and 16 to connect to more than one ISP and to exchange network routing information with other networks.

E-BGP utilizes a best path algorithm that follows a series of steps to determine the best path to a router at a specific destination. For routers and switches that implement BGP, one preferred router is the Catalyst 6509 router, which is commercially available from Cisco Systems, the assignee of the present invention.

Both data centers 12 and 16 advertise the same route but from two different sites. For site-to-site load balancing purposes, both data centers host active applications and serve clients. Applications are software programs that use the operating system to control the data center's computer resources. Applications may be active concurrently for load balancing purposes or the applications can be hosted in a logical active/standby mode. Logical active/standby mode means that some applications will be active on one site while those same applications will be in standby mode at the second site. Different applications will be active at the second site and in a standby mode at the first site. Support for logical active/standby mode depends on the capabilities of specific applications and databases. If supported, IGP is used to route traffic to the data center that is logically active for a specific application.

Communication between data centers 12 and 16 utilizes IGP between edge routers 14 and 18. This is indicated by the IGP 26 link. The configuration of IGP link is dependant on how the applications are hosted and will vary from data center to data center.

In one preferred embodiment, the IP Anycast mechanism allows clients to request the topologically closest data center. This mechanism offers several advantages in routing a request to data centers 12 and 16 including the termination of client requests at the nearest data center thereby minimizing transit times. Typically, the number of hops required for a client to access the site determines the nearest site. Another advantage is that clients achieve "stickiness" and do not bounce between sites because of DNS or Microsoft Internet Explorer algorithms that would arbitrarily route clients to various data centers during a session. Another advantage is that clients are dynamically distributed between available sites thereby load balancing client traffic.

Figure 2:
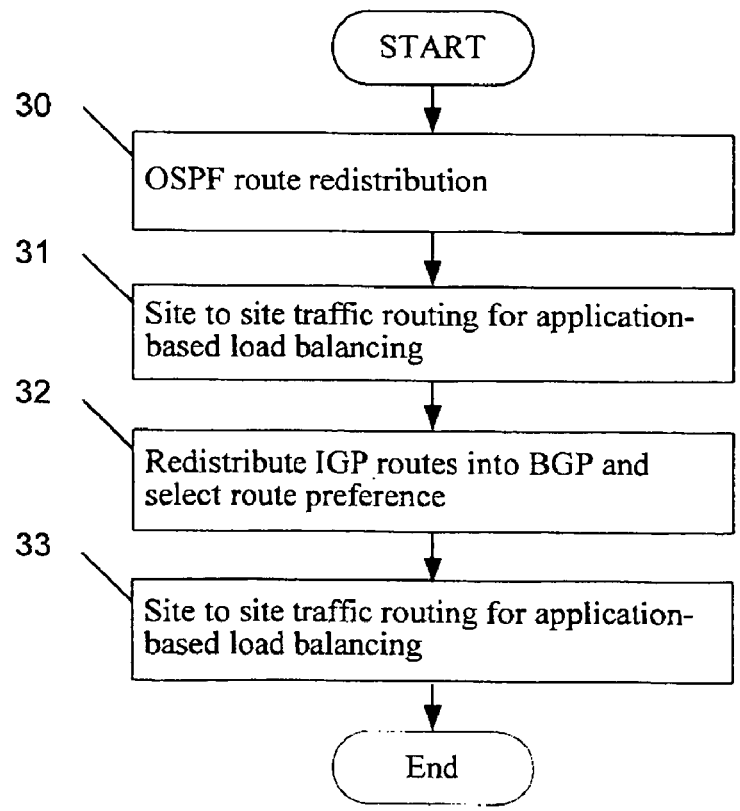
FIG. 2 is a flow diagram illustrating steps for implementing the active/active data center topology in accordance with the present invention.

FIG. 2 is a flow diagram illustrating steps for implementing the active/active data center topology in accordance with the present invention. The initial step is to redistribute OSPF routes as indicated at step 30. Application-based load balancing requires an IGP link, which makes it possible to route traffic between sites within seconds if either data center fails as indicated at step 31. The routes are redistributed and summarized in BGP on the edge routers as indicated in step 32. Network address translation (NAT), as indicated at step 33, may be used to with the application-based design for load distribution for active-active applications.

The application-based design logically partitions the data centers into active/standby sites and load balance traffic for different applications between two sites. If required by the application environment, the route metrics can be changed in the data center so that a specific VIP is active at one site and is on standby at the second site.

Figure 3:
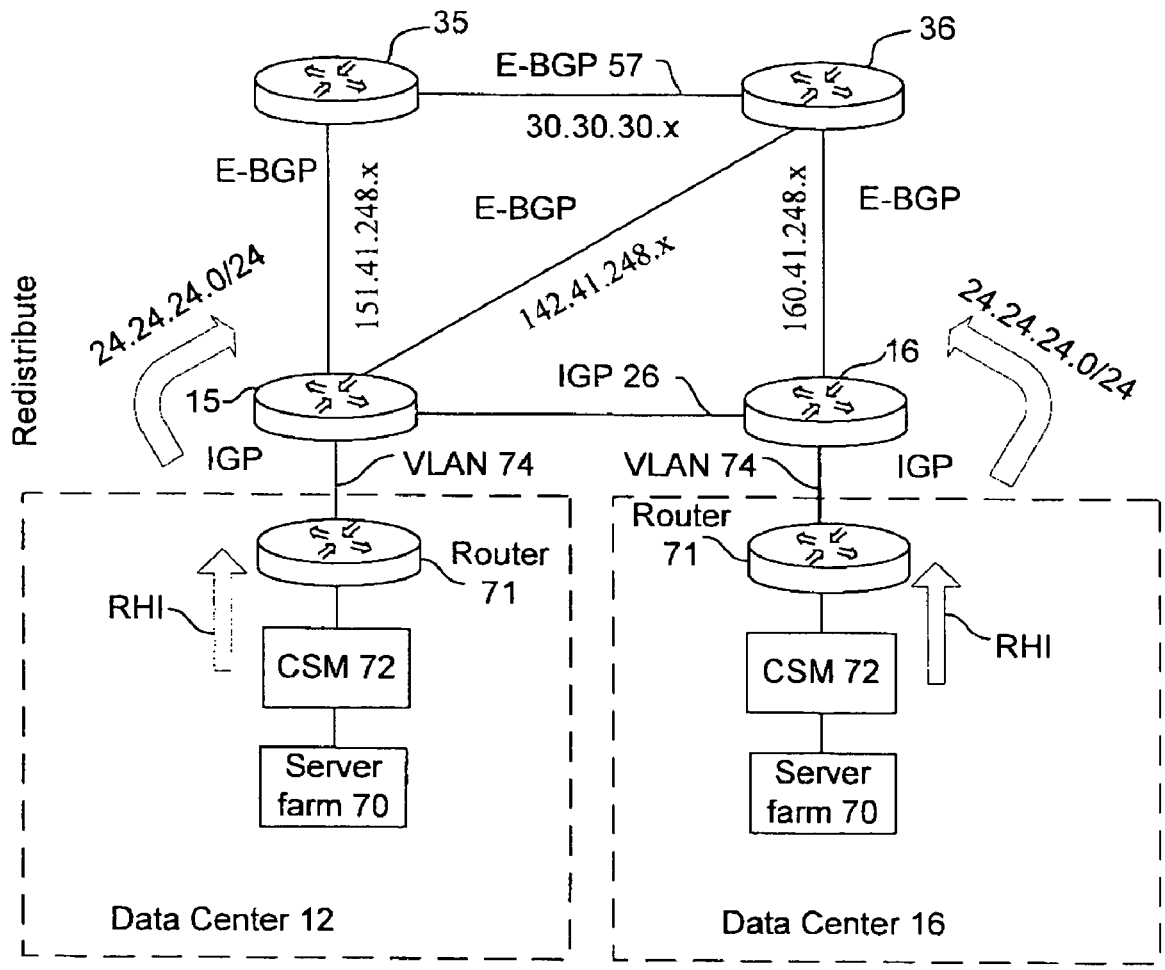
FIG. 3 is a block diagram of another exemplary active/active data center that illustrates an application-based design for implementing load balancing with NAT in accordance with an embodiment of the present invention.

FIG. 3 is a more detailed illustration of the data center topology shown in FIG. 1 that illustrates the use of BGP for data center-to-data center recovery in the event of a disaster. Each data center 12 and 16 comprise a plurality of servers, which are often collectively referred to as server farms 70 coupled to edge routers 71, respectively, by content switching module or CSM 72 which is installed on router 71. CSM 72 is primarily responsible for load balancing client requests to access one of the servers or other computer resource in server farm 70. Typically, each server farm 70 is a replica of the other server farm in order to provide the intended services in an uninterrupted fashion. Data centers 12 and 16 utilize the same virtual IP address (VIP) to represent the server cluster for each application, and the edge routers advertise the same subnet comprising all the VIPs to internet 15 with BGP.

RHI is used to inject routes of interest to routers 71. Each router 71 is preferably a CATALYST 6500 router in which case CSM 72 and router 71 share a common chassis. The CATALYST 6500 router is commercially available from Cisco Systems, the parent corporation of the assignee of the present invention. Routers 71 are coupled to edge routers 15 and 16 by the IGP internal network, which is represented by VLAN 74 in FIG. 3. Edge routers 15 and 16 are coupled to routers 35 and 36 at two different ISPs by links 23 and 24 with edge router 15 coupled by link 25 to a second ISP for redundancy. Links 23, 24 and 25 are preferably E-BGP links.

RHI is activated at each active data center using the "advertise active" command available with virtual servers. This command tells CSM 72 to install a static host route in router 71 only if the virtual server in the server farm is in an operational state. This host route is then redistributed into OSPF routing protocol at router 71 and is advertised to the edge router. A virtual server is in the operational state when at least one of the servers in the same server farm is operational. Extensive probing is available on the CSM 72 to check the health of the servers and the appropriate application daemons.

Implementation of the active/active data center topology of FIG. 3 utilizes OSPF route redistribution and summarization of these routes in BGP. FIG. 3 illustrates subnet-based load balancing solution with the IGP link between the sites. This topology provides disaster recovery by utilizing a combination of IP Anycast, BGP, IGP and route health injection (RHI). A significant advantage of including the IGP link is it is possible to change from an active/active topology to an active/standby topology by merely changing the OSPF cost of the link. Thus, the secondary data center can be taken out of service by a simple IGP cost modification. To illustrate, by just increasing the OSPF cost on the link connecting the edge router to the internal MSFC it is possible for a data center to be brought down for maintenance without stopping BGP updates. The traffic that comes in from other ISPs to the secondary data center can be forwarded to the primary data center over the internal IGP link. Internet clients and ISPs are not aware of any route changes. In most environments, this IGP link is a virtual LAN (VLAN) or other high bandwidth link.

OSPF Route Redistribution

When redistributing RHI static routes into the IGP-specific protocol, OSPF, the metric-type 1 is used for adding the internal cost to the external cost. RHI allows CSM 26 to advertise the availability of a virtual IP (VIP) address throughout the network and to the edge routers 15 or 16. Redistribution is useful when a static route is injected into the routing protocol. Redistribution consists of importing routing information from one routing protocol into another protocol. Multiple CSM devices with identical VIP addresses and services can exist throughout the network and a CSM can override any server load-balancing (SLB) services over other devices if the server is no longer available. The CSM advertises the VIP address as a host route.

The edge routers receive the default route from the ISP and propagate it down to the data center routers 71. The OSPF configuration on the edge routers 15 and 16 looks like the configuration shown in Table 1:

TABLE 1

```
72k-edgePriDC#sh run | beg router ospf
router ospf 1
    log-adjacency-changes
    network 10.0.0.0 0.0.0.255 area 0
    default-information originate
!
```

BGP Route Redistribution and Route Preference

The edge routers 15 and 16 distribute OSPF into their BGP process using a prefix-list and each router updates their neighbor with routes 151.41.248.129 and 1 42.41.248.130 as well as 24.24.24.0/24. The distribution is slightly complicated for edge router 15 because it has links to both ISP 13 and ISP17. ISP 17 is also linked edge router 16. From edge router 15, the preferred embodiment uses MED to configure a lower metric for the route updates sent to router 35 at ISP 13 than for the metric for the route updates sent to router 36 at ISP 17. The MED attribute is used in the BGP tie breaking process when selecting a preferred path to a given address space. As a result, ISP 13 will always prefer data center 12 for reaching 24.24.24.0/24. Further, it is necessary that the weight for the inbound routes (0.0.0.0/0.0.0.0 route) be set so that ISP 13 (referred to as ISP1 in the configuration illustrated in the Tables) has a higher weight (2000) than ISP 17 (referred to as ISP2 in the configuration illustrated in the Tables). As a result, edge router 15 will prefer router 35 at ISP 13 as its default (next-hop) router. The BGP configuration of data center 12 as the primary site edge router 15 is shown in Table 2:

TABLE 2

```
72k-edgePriDC#sh run | beg router bgp
router bgp 3
    no synchronization
    bgp log-neighbor-changes
    network 142.41.248.128 mask 255.255.255.192
    network 151.41.248.128 mask 255.255.255.192
    redistribute ospf 1 route-map OspfRouteFilter
    neighbor 142.41.248.132 remote-as 2
    neighbor 142.41.248.132 route-map WEIGHT-IN in
    neighbor 142.41.248.132 route-map ISP2-OUT out
    neighbor 151.41.248.131 remote-as 1
    neighbor 151.41.248.131 route-map WEIGHT-IN in
    neighbor 151.41.248.131 route-map ISP1-OUT out
    no auto-summary
!
ip as-path access-list 2 permit ^2$
!
ip prefix-list OspfRoute seq 10 permit 130.34.0.0/16 le 32
ip prefix-list OspfRoute seq 15 permit 20.20.20.0/24
ip prefix-list OspfRoute seq 20 permit 24.0.0.0/8 le 32
access-list 10 permit 20.20.0.0 0.0.255.255
access-list 10 permit 130.34.0.0 0.0.255.255
access-list 10 permit 142.41.0.0 0.0.255.255
access-list 10 permit 151.41.0.0 0.0.255.255
access-list 10 permit 24.24.24.0 0.0.0.255
!
route-map ISP1-OUT permit 10
    match ip address 10
    set metric 20
!
route-map ISP2-OUT permit 10
    match ip address 10
    set metric 30
!
route-map WEIGHT-IN permit 10
    match as-path 2
    set weight 200
!
route-map WEIGHT-IN permit 20
    set weight 2000
!
route-map OspfRouteFilter permit 10
    match ip address prefix-list OspfRoute
!
```

The BGP configuration of data center 16 as the secondary site edge router 18 is shown in Table 3:

TABLE 3

```
72k-edgeSecDC#sh run | beg router bgp
router bgp 3
    no synchronization
    bgp log-neighbor-changes
    network 160.41.248.128 mask 255.255.255.192
    redistribute ospf 1 route-map OspfRouteFilter
    neighbor 160.41.248.132 remote-as 2
    neighbor 160.41.248.132 route-map ISP2-OUT out
    no auto-summary
!
ip prefix-list OspfRoute seq 10 permit 140.40.0.0/16 le 32
ip prefix-list OspfRoute seq 15 permit 20.20.20.0/24
ip prefix-list OspfRoute seq 20 permit 24.0.0.0/8 le 32
!
access-list 10 permit 20.20.0.0 0.0.255.255
access-list 10 permit 24.24.24.0 0.0.0.255
!
!
route-map ISP2-OUT permit 10
    match ip address 10
    set metric 20
!
!
route-map OspfRouteFilter permit 10
    match ip address prefix-list OspfRoute
!
!
```

Application-Based Load Balancing Using IGP Between Sites

Once the general configuration for OSPF route redistribution and summarization and BGP route redistribution and route preference is complete, the application-based load balancing solution can be implemented with IGP. Further, in accordance with the present invention, the RHI host route summarization is moved up to the BGP layer on the edge routers. The RHI host route for each application is given a different weight so that some applications are active on the primary site while others are active in the secondary site. It is possible to keep an instance of the application at both sites for backup purposes, as required. Weights are used on the data center MSFC to control active/standby behavior for the virtual IP at each data center. Local active applications are given a lower metric compared to a remote application. For example, the primary site in FIG. 3 is primary for the private addresses 24.24.24.1 and 24.24.24.2 while the secondary site is standby. The secondary site is primary for 24.24.24.3 while the primary site is standby for this route and the associated application.

Configuration on Primary Site

The configuration for router 71 at data center 12 is illustrated in Table 4.

TABLE 4

```
!
router ospf 1
    log-adjacency-changes
    redistribute static metric-type 1 subnets route-map REMOTE-APP
    network 10.0.0.0 0.0.0.255 area 0
    network 10.4.0.16 0.0.0.3 area 0
    network 10.4.1.0 0.0.0.255 area 0
    network 10.6.0.16 0.0.0.3 area 0
    network 130.40.248.0 0.0.0.255 area 0
!
access-list 11 permit 24.24.24.3
!
route-map REMOTE-APP permit 10
    match ip address 11
    set metric 30
!
route-map REMOTE-APP permit 30
    set metric 20
!
```

Table 5 illustrates the configuration for edge router 15.

TABLE 5

```
!
router ospf 1
    log-adjacency-changes
    network 10.0.0.0 0.0.0.255 area 0
    network 141.41.248.128 0.0.0.127 area 1
    default-information originate
!
router bgp 3
    no synchronization
    aggregate-address 24.24.24.0 255.255.255.0 summary-only
    <SNIP>
    no auto-summary
!
!
```

Configuration on Secondary Site

The configuration for router 71 at secondary data center 16 is illustrated in Table 6.

TABLE 6

```
!
router ospf 1
    log-adjacency-changes
    redistribute static metric-type 1 subnets route-map REMOTE-APP
    network 10.10.0.0 0.0.0.255 area 1
    network 10.14.0.16 0.0.0.3 area 1
    network 10.14.1.0 0.0.0.255 area 1
    network 10.16.0.16 0.0.0.3 area 1
    network 140.40.248.0 0.0.0.255 area 1
!
!
access-list 11 permit 24.24.24.1
access-list 11 permit 24.24.24.2
!
route-map REMOTE-APP permit 10
    match ip address 11
    set metric 30
!
route-map REMOTE-APP permit 30
    set metric 20
!
```

Table 7 illustrates the configuration for edge router 16.

TABLE 7

```
router ospf 1
    log-adjacency-changes
    network 10.10.0.0 0.0.0.255 area 1
    network 141.41.248.128 0.0.0.127 area 1
    default-information originate
!
router bgp 3
    no synchronization
    aggregate-address 24.24.24.0 255.255.255.0 summary-only
    <SNIP>
    no auto-summary
!
!
```

Routes During Steady State

The steady state routes for routers 15 and 16 are illustrated in Table 8.

TABLE 8

```
Primary Edge Router 15

72k-edgePriDC#sh ip route | in 24.24.24
B       24.24.24.0/24 [200/0] via 0.0.0.0, 00:14:45, Null0
O E1    24.24.24.1/32 [110/21] via 10.0.0.6, 00:14:41, FastEthernet1/1
O E1    24.24.24.2/32 [110/21] via 10.0.0.6, 00:14:41, FastEthernet1/1
O E1    24.24.24.3/32 [110/22] via 141.41.248.130, 00:14:41,
FastEthernet0/0
72k-edgePriDC#
72k-edgePriDC#
Secondary Edge Router 16

72k-edgeSecDC#sh ip route | in 24.24.24
B       24.24.24.0/24 [200/0] via 0.0.0.0, 00:15:17, Null0
O E1    24.24.24.1/32 [110/22] via 141.41.248.129, 00:15:13,
FastEthernet5/0
O E1    24.24.24.2/32 [110/22] via 141.41.248.129, 00:15:13,
FastEthernet5/0
O E1    24.24.24.3/32 [110/21] via 10.10.0.6, 00:15:13, FastEthernet4/0
72k-edgeSecDC#
```

Table 9 illustrates a test case that was conducted to verify the topology shown in FIGS. 1 and 3 where the servers at the primary data center 12 are down. The IGP route changed over within 5 seconds, as did the BGP route.

TABLE 9

Primary Edge Router

```
72k-edgePriDC#sh ip route | in 24.24.24
B         24.24.24.0/24 [200/0] via 0.0.0.0, 00:16:50, Null0
O E1      24.24.24.1/32 [110/32] via 141.41.248.130, 00:00:04,
FastEthernet0/0
O E1      24.24.24.2/32 [110/32] via 141.41.248.130, 00:00:04,
FastEthernet0/0
O E1      24.24.24.3/32 [110/22] via 141.41.248.130, 00:00:04,
FastEthernet0/0
72k-edgePriDC#
```

Secondary Edge Router

```
72k-edgeSecDC#sh ip route | in 24.24.24
B         24.24.24.0/24 [200/0] via 0.0.0.0, 00:16:59, Null0
O E1      24.24.24.1/32 [110/31] via 10.10.0.6, 00:00:14,
          FastEthernet4/0
O E1      24.24.24.2/32 [110/31] via 10.10.0.6, 00:00:13,
          FastEthernet4/0
O E1      24.24.24.3/32 [110/21] via 10.10.0.6, 00:00:13,
          FastEthernet4/0
72k-edgeSecDC#
3500AP#traceroute 24.24.24.3
Type escape sequence to abort.
Tracing the route to 24.24.24.3
1 55.55.1.1 0 msec 0 msec              (ISP1)
  2 msec
2 151.41.248.129 0 msec 0              (Primary Site Edge
  msec 2 msec                           Router)
3 141.41.248.130 3 msec 3              (Secondary site
  msec 0 msec                           Edge Router)
4 10.10.0.6 5 msec 2 msec 0            (Secondary Data
  msec                                  Center)
  5 * * *
```

When implementing the present invention, it is important to note that long-lived TCP applications may break due to instability in the routing infrastructure. It is also important that the CSM shares a VLAN with the MSFC in the same Catalyst 6500 chassis so that RHI will function properly. In one preferred embodiment, the internal path between the sites does not include a firewall but if a firewall is present, it should be either a Layer 2 firewall or a Layer 3 firewall capable of running IGP protocol such as OSPF.

Using NAT in Active/Active Load Balancing Solutions

In another preferred embodiment, network address translation (NAT) is applied to the active/active topology for the two application-based implementations. In this embodiment, virtual IP addresses that represent applications are private IP addresses that are one-to-one translated to public IP addresses for load balancing:

FIG. 3 further illustrates an application-based topology design for implementing load balancing with NAT. NAT is preferably used in an active/active load balancing topology where the sites linked with an IGBP bus. However, if IGBP bus 26 is unavailable, then a NAT implementation requires conditional advertisements when redistributing a configured static route into BGP to avoid a traffic black-hole.

In this embodiment, the VIP addresses used to represent the applications are private IP addresses that are one-to-one NATed to public IP addresses. By way of illustration, a private address 24.24.24.1 is NATed to the public address 124.124.124.1 and the 24.24.24.0 subnet would be in the 10.0.0.0 address space. Implementing the NAT function requires a the following changes to the configurations as illustrated in Tables 10 for the primary site edge router and in Table 11 for the secondary site edge router.

TABLE 10

```
interface FastEthernet0/0
    description "To 5/0 72kEdge(IBGP)"
    ip address 141.41.248.129 255.255.255.192
    ip nat inside
    duplex full
!
interface FastEthernet1/1
    description To cat6k-1 f2/26
    ip address 10.0.0.129 255.255.255.0
    ip nat inside
    duplex full
!
interface FastEthernet2/0
    description "To 2/13 Cat6k(ISP1)"
    ip address 151.41.248.129 255.255.255.192
    ip nat outside
    duplex full
!
interface FastEthernet3/0
    description "To 2/1 72k(ISP2)"
    ip address 142.41.248.129 255.255.255.192
    ip nat outside
    duplex full
!
!
router bgp 3
    no synchronization
    bgp log-neighbor-changes
    redistribute static
    <SNIP>
    no auto-summary
!
ip nat inside source static 24.24.24.1 124.124.124.1
ip nat inside source static 24.24.24.2 124.124.124.2
ip nat inside source static 24.24.24.3 124.124.124.3
!
ip route 124.124.124.0 255.255.255.0 Null0
!
!
!
```

TABLE 11

```
interface FastEthernet3/0
    description "To 3/0 72k(ISP2)"
    ip address 160.41.248.130 255.255.255.192
    ip nat outside
    duplex full
!
interface FastEthernet4/0
    ip address 10.10.0.130 255.255.255.0
    ip nat inside
    duplex full
!
interface FastEthernet5/0
    description "To 0/0 72kPriDC"
    ip address 141.41.248.130 255.255.255.192
    ip nat inside
    duplex full
!
!
router bgp 3
    no synchronization
    redistribute static
    <SNIP>
    no auto-summary
!
ip route 124.124.124.0 255.255.255.0 Null0
!
!
ip nat inside source static 24.24.24.1 124.124.124.1
ip nat inside source static 24.24.24.2 124.124.124.2
ip nat inside source static 24.24.24.3 124.124.124.3
!
72k-edgeSecDC#
```

The routing tables and the steady state routes advertised to peers are illustrated in Table 12.

TABLE 12

```
72k-edgePriDC#
72k-edgePriDC#sh ip bgp 0.0.0.0
BGP routing table entry for 0.0.0.0/0, version 57
Paths: (2 available, best #1, table Default-IP-Routing-Table)
    Not advertised to any peer
    1
        151.41.248.131 from 151.41.248.131 (151.41.248.131)
            Origin IGP, localpref 100, weight 2000, valid, external, best
    2
        142.41.248.132 from 142.41.248.132 (160.41.248.132)
            Origin IGP, localpref 100, weight 200, valid, external
72k-edgePriDC#
72k-edgePriDC#
72k-edgePriDC#sh ip route | in 24.24.24.
O E1              24.24.24.1 [110/21] via 10.0.0.6, 1d10h, FastEthernet1/1
O E1              24.24.24.2 [110/21] via 10.0.0.6, 1d10h, FastEthernet1/1
O E1              24.24.24.3 [110/22] via 141.41.248.130, 1d10h, FastEthernet0/0
72k-edgePriDC#
72k-edgePriDC#
72k-edgePriDC#sh ip route | in 124.124.124.
S       124.124.124.0 is directly connected, Null0
72k-edgePriDC#
72k-edgePriDC#
Cat6k-ISP1#sh ip bgp
BGP table version is 6, local router ID is 151.41.248.131
Status codes: s suppressed, d damped, h history, * valid, > best, i -
internal
Origin codes: i - IGP, e - EGP, ? - incomplete
    Network          Next Hop         Metric LocPrf    Weight Path
*  124.124.124.0/24  30.30.30.132                       0 2 3 ?
*>                   151.41.248.129   20                0 3 ?
*  142.41.248.128/26
                     30.30.30.132     0                 0 2 i
*>                   151.41.248.129   20                0 3 i
*> 151.41.248.128/26
                     0.0.0.0          0                 32768 i
*                    30.30.30.132                       0 2 3 i
*                    151.41.248.129   20                0 3 i
*> 160.41.248.128/26
                     30.30.30.132     0                 0 2 i
Cat6k-ISP1#
Cat6k-ISP1#
Cat6k-ISP1#
Cat6k-ISP1#sh ip bgp 124.124.124.0
BGP routing table entry for 124.124.124.0/24, version 2
Paths: (2 available, best #2)
    Advertised to non peer-group peers:
    30.30.30.132
    2 3
        30.30.30.132 from 30.30.30.132 (160.41.248.132)
            Origin incomplete, localpref 100, valid, external
    3
        151.41.248.129 from 151.41.248.129 (151.41.248.129)
            Origin incomplete, metric 20, localpref 100, valid, external, best
Cat6k-ISP1#
Cat6k-ISP1#
72k-ISP2#sh ip bgp
BGP table version is 16, local router ID is 160.41.248.132
Status codes: s suppressed, d damped, h history, * valid, > best, i -
internal, r RIB-failure, S Stale
Origin codes: i - IGP, e - EGP, ? - incomplete
    Network          Next Hop         Metric LocPrf    Weight Path
*  124.124.124.0/24  30.30.30.131                       0 1 3 ?
*                    142.41.248.129   30                0 3 ?
*>                   160.41.248.130   20                0 3 ?
*  142.41.248.128/26
                     30.30.30.131                       0 1 3 i
*>                   0.0.0.0          0                 32768 i
*                    142.41.248.129   30                0 3 i
*  151.41.248.128/26
                     30.30.30.131     0                 0 1 i
*>                   142.41.248.129   30                0 3 i
*> 160.41.248.128/26
                     0.0.0.0          0                 32768 i
72k-ISP2#
```

TABLE 12-continued

```
72k-ISP2#
72k-ISP2#sh ip bgp 124.124.124.0
BGP routing table entry for 124.124.124.0/24, version 3
Paths: (3 available, best #3, table Default-IP-Routing-Table)
    Advertised to non peer-group peers:
    30.30.30.131 142.41.248.129
    1 3
        30.30.30.131 from 30.30.30.131 (151.41.248.131)
            Origin incomplete, localpref 100, valid, external
    3
        142.41.248.129 from 142.41.248.129 (151.41.248.129)
            Origin incomplete, metric 30, localpref 100, valid, external
    3
        160.41.248.130 from 160.41.248.130 (160.41.248.130)
            Origin incomplete, metric 20, localpref 100, valid, external, best
72k-ISP2#
72k-ISP2#
72k-edgeSecDC#
72k-edgeSecDC#sh ip bgp 0.0.0.0
BGP routing table entry for 0.0.0.0/0, version 25
Paths: (1 available, best #1, table Default-IP-Routing-Table)
    Not advertised to any peer
    2
        160.41.248.132 from 160.41.248.132 (160.41.248.132)
            Origin IGP, localpref 100, valid, external, best
72k-edgeSecDC#
72k-edgeSecDC#
72k-edgeSecDC#sh ip route | in 24.24.24.
O E1                 24.24.24.1 [110/22] via 141.41.248.129, 1d10h, FastEthernet5/0
O E1                 24.24.24.2 [110/22] via 141.41.248.129, 1d10h, FastEthernet5/0
O E1                 24.24.24.3 [110/21] via 10.10.0.6, 1d10h, FastEthernet4/0
72k-edgeSecDC#
72k-edgeSecDC#sh ip route | in 124.124.124.
S                    124.124.124.0 is directly connected, Null0
72k-edgeSecDC#
72k-edgeSecDC#
3500AP#
3500AP#traceroute 124.124.124.1
Type escape sequence to abort.
Tracing the route to 124.124.124.1
    1 55.55.1.1 5 msec 2 msec 3 msec (ISP1)
    2 151.41.248.129 2 msec 2 msec 3 msec (Primary Site Edge Router)
    3 10.0.0.6 3 msec 6 msec 2 msec (Primary Site Data Center)
    4 * * *
```

Table 13 illustrates Routes after servers in primary data center 12 go down and, as indicated, there are no route changes at either ISP 13 or 17 (see FIG. 1).

TABLE 13

```
72k-edgePriDC#
72k-edgePriDC#sh ip route | in 24.24.24.
O E1    24.24.24.1 [110/32] via 141.41.248.130, 00:00:31,
        FastEthernet0/0
O E1    24.24.24.2 [110/32] via 141.41.248.130, 00:00:31,
        FastEthernet0/0
O E1    24.24.24.3 [110/22] via 141.41.248.130, 00:00:31,
        FastEthernet0/0
72k-edgePriDC#
72k-edgeSecDC#
72k-edgeSecDC#sh ip route | in 24.24.24.
O E1    24.24.24.1 [110/31] via 10.10.0.6, 00:00:46,
        FastEthernet4/0
O E1    24.24.24.2 [110/31] via 10.10.0.6, 00:00:46,
        FastEthernet4/0
O E1    24.24.24.3 [110/21] via 10.10.0.6, 00:00:46,
        FastEthernet4/0
72k-edgeSecDC#
72k-edgeSecDC#
3500AP#traceroute 124.124.124.1
Type escape sequence to abort.
Tracing the route to 124.124.124.1
    1 55.55.1.1 6 msec 5 msec 3 msec              (ISP1)
```

TABLE 13-continued

```
    2 151.41.248.129 2 msec 3 msec 0 msec    (Primary Site Edge
                                             Router)
    3 141.41.248.130 6 msec 2 msec 3 msec    (Secondary Site Edge
                                             Router)
    4 10.10.0.6 2 msec 3 msec 2 msec         (Secondary Site Data
                                             Center)
    * * *
```

Accordingly, the present invention provides the architecture and topology of at least two data centers with at least one active data center connected to multiple ISPs. It will be apparent to one of skill in the art that other architectures or topologies may be successfully employed and the described embodiments are not intended to be limiting. Further, although the present embodiments are described in terms of a distributed data center, other networks or network systems may use the invention to provide disaster recovery.

Although the invention has been described with respect to specific embodiments thereof, these embodiments are merely illustrative, and not restrictive of the invention. For example, the network may include different routers, switches, servers and other components or devices that are common in such networks. Further, these components may comprise software algorithms that implement connectivity functions between the network device and other devices in a manner different from that described herein.

The executable code described herein may be implemented in any suitable programming language to implement the routines of the present invention including C, C++, Java, assembly language, etc. Different programming techniques can be employed such as procedural or object oriented. The routines can operate in an operating system environment or as stand-alone routines occupying all, or a substantial part, of the system processing.

In the description herein, specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. For example, although the embodiments are described in terms of a router and specifically a Cisco Catalyst 6500 router, other routers from Cisco or other manufacturers, aggregators or network switches may be used. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain and store the program for use by or in connection with the instruction execution system, apparatus, system or device. The memory can be, by way of example only but not by limitation, a semiconductor system, apparatus, system, device, or computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A data center topology coupled to the internet, the data center topology comprising:

first and second active data centers, the first and second data centers being coupled to the Internet via respective first and second edge routers, wherein each of the first and second data centers comprise computer resources, wherein the first and second edge routers are coupled directly to a first Internet service provider (ISP) using a Border Gateway Protocol (BGP), wherein the second edge router is coupled directly to a second ISP using the BGP, wherein the first edge router is not coupled directly to the second ISP, wherein the data centers are in an autonomous system having a common administration and common routing policies, each edge router broadcasting a common Internet Protocol (IP) address, the edge router linking the first and second data centers to each other using an Interior Gateway Protocol (IGP); each of said edge routers having a multilayer switch feature card (MSFC); each edge router configured to redistribute route health injection (RHI) routes into open shortest path first (OSPF) and to summarize a host route on said MSFC; each edge router further adapted to distribute OSPF into their BGP process using a prefix-list and to update neighboring routers with said routes;

means for implementing application-based load balancing between said first and second data centers; and means for detecting a disaster at one of said first and second data centers by detecting a route being removed from a routing table.

2. The data center topology of claim 1 wherein each of the first and second data centers is logically partitioned into an active and a standby site.

3. The data center topology of claim 1 wherein each of the first and second edge routers are coupled by an internal network to a router and content switching module, said content switching module and said router sharing a common chassis for supporting virtual IP addresses.

4. The data center topology of claim 3 wherein a same virtual IP address (VIP) to represent the server cluster at each data center for each application.

5. The data center topology of claim 1 further comprising means for translating private virtual IP addresses to a public IP address.

6. A method for load balancing and recovering from a disaster comprising:

hosting active applications and serving clients from first and second active data centers in an autonomous system having a common administration and common routing policies, the first and second data centers being coupled to the Internet via respective first and second edge routers, wherein each of the first and second data centers comprise computer resources, wherein the first and second edge routers are coupled directly to a first Internet service provider (ISP) using a Border Gateway Protocol (BGP), wherein the second edge router is coupled directly to a second ISP using the BGP, wherein the first edge router is not coupled directly to the second ISP, wherein the data centers are in an autonomous system having a common administration and common routing policies, each edge router broadcasting a common Internet Protocol (IP) address, the edge router linking the first and second data centers to each other using an Interior Gateway Protocol (IGP); each of said edge routers having a multilayer switch feature card (MSFC); each edge router configured to redistribute route health injection (RHI) routes into open shortest path first (OSPF) and to summarize a host route on said MSFC; each edge router further adapted to distribute OSPF into their BGP process using a prefix-list and to update neighboring routers with said routes;

configuring route summarization in BGP;

configuring BGP route redistribution and route preference to update neighboring routers; and using application-based load balancing on a direct link between said first and second data centers.

7. The method of claim 6 further comprising using Exterior Border Gateway Protocol (E-BGP) for interautonomous system routing and to exchange network routing information with other networks.

8. The method of claim 7 further comprising the step of controlling incoming and outgoing routes in BGP by the using weights.

9. The method of claim 7 further comprising probing the health of the servers in each of the first and second data centers and application daemons that run on the servers.

10. A data center system coupled to the internet, the data center comprising:

first and second active data centers, the first and second data centers being coupled to the Internet via respective first and second edge routers, wherein each of the first and second data centers comprise computer resources, wherein the first and second edge routers are coupled directly to a first Internet service provider (ISP) using a Border Gateway Protocol (BGP), wherein the second edge router is coupled directly to a second ISP using the BGP, wherein the first edge router is not coupled directly to the second ISP, wherein the data centers are in an autonomous system having a common administration and common routing policies, each edge router broadcasting a common Internet Protocol (IP) address, each of said edge routers having a multilayer switch feature card (MSFC), and each of the first and second edge routers configured to:

redistribute route health injection (RHI) routes into open shortest path first (OSPF);

summarize a host route on said MSFC;

distribute routes from open shortest path first (OSPF) into the BGP process of each edge router using a prefix-list to update neighboring routers with said routes; and utilize an Interior Gateway Protocol (IGP) link for coupling said first and second data centers.

11. The data center system of claim 10 wherein one of said the first and second data centers may change its active status by an IGP cost modification.

12. The data center system of claim 10 wherein each of the first and second data centers comprises a server farm having a plurality of servers and computer resources coupled to said first and second edge routers by a router and a load balancer.

13. The data center system of claim 12 wherein said servers use route health injection (RHI) to inject static host routes of interest to said router if said server farm is in an operational state.

14. The data center system of claim 13 wherein said router redistributes said static host route into its OSPF routing protocol and advertises said route to said first and second edge routers.

15. The data center system of claim 14 wherein said first and second edge routers use an IP Anycast mechanism to load balance client requests.

16. The data center system of claim 12 wherein said router is coupled to said first and second edge routers by an IGP link.

17. The data center system of claim 10 wherein each of said first and second edge routers is linked to a multilayer switch feature card.

18. The data center system of claim 11 wherein said one of said first and second edge routers configures a first metric for the route updates sent to a router at said first internet service provider and a second metric for the route updates sent a router at said second internet service provider such that said first internet service provider is configured to be the preferred path to said first and second data centers.

19. The data center system of claim 18 wherein inbound routes to said first and second data centers are set so that said first and second edge routers select said first internet service provider as a next-hop router.

* * * * *